Nov. 10, 1925.
A. C. NOBLE
EYEGLASSES
Filed Feb. 21, 1923
1,560,717
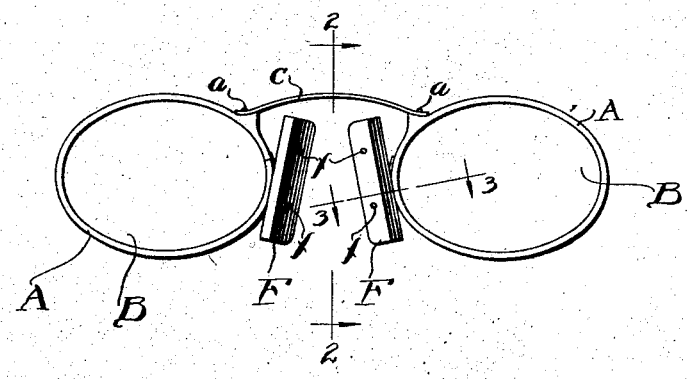
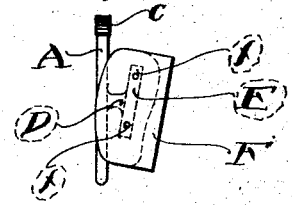
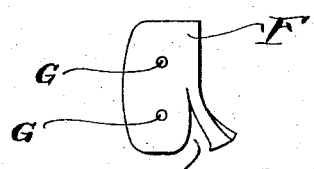
Inventor:
H. Alanson C. Noble,
By Charles Turner Brown,
Atty.

Patented Nov. 10, 1925.

1,560,717

UNITED STATES PATENT OFFICE.

ALANSON C. NOBLE, OF CHICAGO, ILLINOIS.

EYEGLASSES.

Application filed February 21, 1923. Serial No. 620,325.

*To all whom it may concern:*

Be it known that I, ALANSON C. NOBLE, a citizen of the United States, and a resident of Chicago, in the county of Cook and State of Illinois, have invented certain new and useful Improvements in Eyeglasses, of which the following is a specification.

This invention relates to eye glasses which are provided with abutments arranged to be yieldingly held against the nose of the wearer when adjusted for use.

Among the objects of this invention is to obtain an elastic abutment or pad of comparatively large area, which may be cut or trimmed by the oculist or other person adjusting the eye glasses to fit the nose and face of the wearer thereof; and an abutment or pad which will adhere to said nose or face sufficiently to prevent the eye glasses from easily becoming disarranged or from falling from the adjusted position thereof. An additional object is to obtain an abutment or pad which can be applied to the means now known and used for adjusting eye glasses and retaining them in place by yielding pressure applied to the sides of the nose of a wearer, and to obtain an abutment or pad of the kind recited which is inexpensive, easily mounted, of sightly appearance, durable, easily dismounted and readily replaced by similar abutments or pads.

In the drawing referred to

Fig. 1 is an elevation of eyeglasses comprising an embodiment of my invention;

Fig. 2 is a vertical section on line 2—2 of Fig. 1, viewed as indicated by arrows;

Fig. 3 is a horizontal section on line 3—3 of Fig. 1, looking down, as indicated by arrows;

Fig. 4 is a front elevation of a pad or abutment removed from the eye glasses, illustrating the manner of obtaining contour lines thereof to fit the wearer; and Fig. 5 is a front elevation of a portion of one of the lenses of the eye glasses illustrated in Fig. 1, with a portion of the standard on which the abutment or pad is mounted attached to the frame of the lens.

A reference character applied to designate a given part indicates said part throughout the several figures of the drawing wherever the same appears.

I have illustrated eye glasses embodying my invention provided with a frame, usually of tortoise or imitation tortoise shell, and A represents the frame, B the lenses in frame A, C the bar which extends across the nose, and is attached to the frame A, at the ends, as by screws $a$, $a$, and D, D the standards on which the abutments or pads designed to come against the nose of the wearer are mounted. Standards D, D, are secured to frame A, as by the rivets or screws $d$, $d$. E, illustrated in section by full lines in Fig. 3 and indicated by broken lines in Fig. 2, represents an abutment on standard D. A standard D and an abutment E is attached to each of the frames A, A, said standards and abutments being rights and lefts, but otherwise duplicates. F, F, represents abutments or pads, which are preferably made of flexible yieldingly vulcanized rubber, and which, however made, have a yielding rubber face to the side thereof which comes in contact with the nose or face of the wearer of the eye glasses, and $f$, $f$, represent rivets by means of which said abutments or pads F, F, are illustrated as secured on abutments E, E.

Abutments or pads F, F, may be made of textile material and yielding rubber, the rubber being secured to the textile material by cement or other equivalent adhesive material, on the face thereof which is adjacent to the nose of the wearer, so that said yielding rubber comes in contact with the nose, or with the face of the wearer adjacent to the nose.

G, G, Fig. 4, represent apertures in abutment or pad F through which the screws or rivets $f$, $f$, extend to secure said abutment or pad to abutment E; and H represents a cut in abutment or pad F, to remove a portion of one side or edge thereof to make the abutment or pad fit the wearer. This cutting or trimming of the abutment or pad F is not made until it is secured to the abutment E, and is then made by the oculist or other person fitting the eye glasses to the wearer after placing the eye glasses on the nose of the wearer and noting where said cutting and trimming is required to obtain the required contour lines of the abutment or pad, which is made of yielding material that can be so cut.

When the proper contour lines are obtained the abutment or pad F may extend a short distance beyond the nose of the wearer and on to the face, adjacent to the nose. When trimmed and adjusted, as recited, it will be found that abutment or pad F, comprising yielding rubber on the face thereof which comes in contact with the skin, will adhere thereto, without causing indentations in the skin in such manner as to resist all ordinary causes tending to dislodge or misplace the eye glasses.

The nose bar C is made of resilient material, or resilient material is interposed between the standards D, D, and the nose bar, as occurs in the usual construction of eye glasses, to obtain a yielding pressure of the abutments E, E, (and also of pads F, F) against the nose, to retain the eye glasses in place; and the area of said pads F, F, is sufficient when acting on the yielding material of the pads to obtain a firm base on which the eye glasses are supported.

I claim:

1. Eye glasses comprising lenses, rims, a nose bar and standards, respectively mounted on said rims, and abutments, means comprising said standards, to mount said abutments on said rims in combination with pads mounted on said abutments and consisting of yielding sheet material on the sides thereof which are arranged to come in contact with the skin of the wearer of said eye glasses, said pads of larger area than and extending beyond the contour lines of said abutments to form bases adapted to support said eye glasses, said bases having an area sufficient to prevent indentations in the skin in contact therewith.

2. Eye glasses comprising lenses, a nose bar, standards and abutments on said standards, in combination with pads secured on said abutments, means to yieldingly force said pads against the nose of a wearer of said eye glasses, said pads comprising faces of yielding rubber positioned to come in contact with the skin of the wearer and provided with contour lines corresponding with the face of the wearer of said eye glasses, and having an area sufficient to prevent indentations in the skin in contact therewith, and to form bases adapted to support said eye glasses.

ALANSON C. NOBLE.